Sept. 11, 1928.

R. C. ALLEN

POWER PLANT

Filed Sept. 24, 1925

1,684,082

WITNESSES:

R. C. ALLEN
INVENTOR

BY

ATTORNEY

Patented Sept. 11, 1928.

1,684,082

UNITED STATES PATENT OFFICE.

ROBERT C. ALLEN, OF SWARTHMORE, PENNSYLVANIA, ASSIGNOR TO WESTINGHOUSE ELECTRIC & MANUFACTURING COMPANY, A CORPORATION OF PENNSYLVANIA.

POWER PLANT.

Application filed September 24, 1925. Serial No. 58,375.

My invention relates to power plants and particularly to power plants embodying organized turbine apparatus for driving electrical generators, and it has for an object to provide apparatus of the character designated which shall be compactly arranged and capable of developing an extraordinary amount of electrical energy by the employment of only a single organization of turbine elements. It has for a further object to provide a turbine organization in which the various elements shall be entirely free to expand independently of each other and in which the receiver pipes connecting the respective elements may expand and contract freely without producing excessive strains or stresses in the connected elements.

Figure 1:
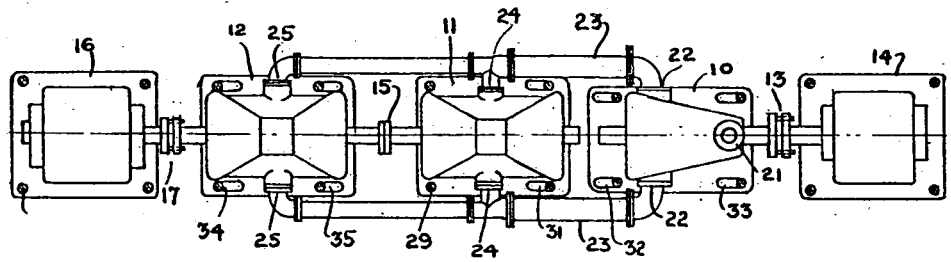
Figure 2:
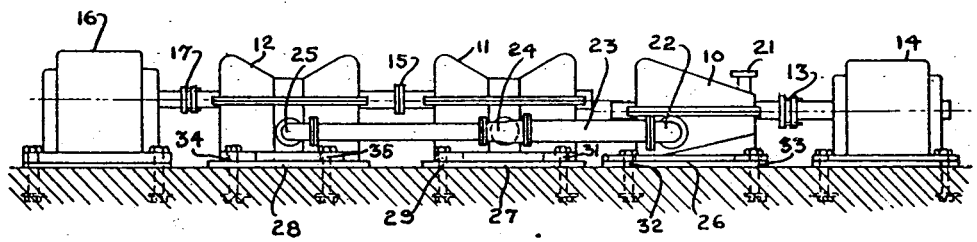
Figure 3:
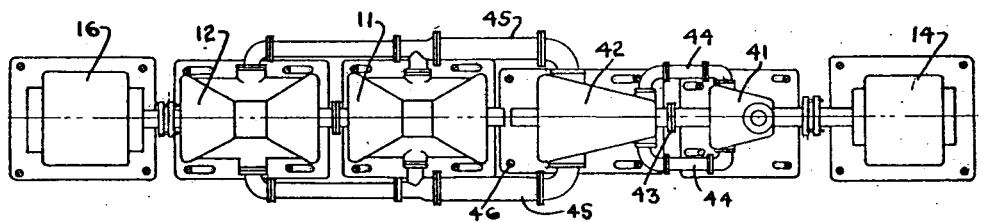

These and other objects, which will be made apparent throughout the further description of my invention, may be attained by the employment of the apparatus hereinafter described and illustrated in the accompanying drawing in which Fig. 1 is a plan view of one form of power plant arranged in accordance with my invention; Fig. 2 is a view, in elevation, of the power plant shown in Fig. 1; and Fig. 3 is a plan view of another embodiment of my invention which is similar to that shown in Fig. 1 with the exception that the high pressure turbine element is subdivided into high and intermediate pressure elements.

In turbine organizations of such large aggregate capacities as 100,000 or 150,000 k. w., the receiver piping connecting the various turbine elements reaches extremely large proportions. For example, the pipe leading from the high pressure element of a 100,000 k. w. machine may be approximately 100" in diameter. It has heretofore been the practice in turbine organizations of relatively smaller capacities to provide such bends or slip joints in the piping as will permit of its free expansion and contraction without causing excessive strains or stresses to be set up in the connected turbine elements. However, in the larger turbine organizations, the size of the piping is such as to make such a practice extremely difficult.

I have therefore conceived the idea of arranging all of the turbine elements, as well as their connected generators, in end-to-end relation with their axes disposed in substantially a common vertical plane. I then fixedly secure one end of one of the turbine elements, leaving the remaining end of that turbine element together with both ends of all the other turbine elements to expand freely in a longitudinal direction. In this way, a very compact and symmetrical disposition of the entire number of turbine elements and electrical generators is provided. However, by means of such an arrangement, I may provide rigid and direct connecting receiver pipes because the various connected turbine elements are free to move back and forth in response to thermal changes which may take place in themselves and in the receiver piping.

It is apparent that such a turbine organization materially simplifies the receiver piping besides providing a compact and well-organized turbine arrangement. All of the receiver piping is free to expand or contract without imparting or setting up excessive strains or stresses in the connected turbine elements. One of the principal advantages of such an arrangement resides in the fact that the turbine elements may be independently connected to respective generators and thus may operate at different rotational velocities as determined by the efficiency characteristics of both turbines and generators.

Referring to the drawing for a more detailed description of my invention, I show, in Figs. 1 and 2, a high pressure turbine element 10 and low pressure turbine elements 11 and 12. The high pressure turbine element 10 is connected through a suitable coupling 13 to an electrical generator 14 while the low pressure turbine elements 11 and 12 are connected to each other, tandem-fashion, by a suitable coupling 15 and also to an electrical generator 16 through a suitable coupling 17. As shown in the drawing, the three turbine elements, together with both generators, are preferably arranged in end-to-end relation with their axes disposed in substantially a common vertical plane. The low pressure elements 11 and 12 are connected to the generator 16 while the high pressure turbine element 10 is independently connected to the generator 14, so that the two generators 14 and 16 may operate at relatively different speeds, if required. The axis of the high pressure turbine element 10 and its generator 14 may or may not be located in the same horizontal plane with the low pressure turbine elements 11 and 12 and their generator 16, these two axes being arranged to suit the installation requirements.

The high pressure turbine 10 is provided with a motive fluid inlet 21 and dual exhaust connections 22—22. The exhaust connections 22 are connected through dual receiver pipes 23—23 with motive fluid inlets 24—24 and 25—25 provided in the low pressure turbine elements 11 and 12, respectively. As shown, the receiver pipes 23 may be connected directly to the various turbine elements, the provision of flexible bends, slip or expansion joints being unnecessary. Preferably, the receiver pipes are connected between the horizontal joint usually provided in turbine elements and the operating floor, the piping being preferably located near the horizontal axis of the connected turbine elements.

The turbine elements 10, 11 and 12 are all located upon respective sole plates 26, 27 and 28 or any other equivalent means adapted to permit free, horizontal movement of the turbine elements relatively to their foundations. The low pressure turbine 11 is fixedly secured to the foundation as at 29, while the opposite end 31 of this turbine element, as well as both ends 32, 33, 34 and 35 of the high pressure and low pressure elements 10 and 12, respectively, are arranged to move freely in a longitudinal direction. The couplings 13 and 17, may be of the flexible type in order to permit relative longitudinal movement between the turbine elements and the generators as well as between the turbine elements themselves. The longitudinal flexibility may not be needed if the turbine elements are such as to permit some limited amount of relative end movement between rotors and stators.

The operation of this embodiment of my invention is as follows: Assuming the power plant to be inactive, the various turbine elements are located with respect to their foundations or sole plates as shown in Figs. 1 and 2. However, upon admitting steam to the high pressure turbine through the inlet 21 and upon this turbine exhausting through the receiver pipes 23 to the low pressure turbine elements 11 and 12, the receiver pipes 23 assume a higher temperature and consequently expand in length. In addition, each turbine element itself expands or increases in size. Upon such expansion taking place, the end 29 of the low pressure turbine element 11 remains fixed while the end 31 of this element is permitted to move freely in a longitudinal direction. A portion of this movement together with the increase in the length of the receiver pipes is transmitted to the high pressure turbine element 10 and the low pressure turbine element 12 and these two elements move longitudinally away from the low pressure element 11. The couplings 13 and 17 being, if desired, of the flexible type, permit the generators 14 and 16 to remain stationary. The coupling 15, located between the two low pressure turbine elements, may also be arranged to permit some relatively longitudinal movement therebetween.

By means of the above arrangement, the respective turbine elements are entirely free to expand or contract relative to each other. In addition, the receiver piping may be of the simplest possible form and may directly and rigidly connect each turbine element. While the two low pressure turbine elements and the high pressure turbine element are directly connected to each other by the receiver pipes, nevertheless my arrangement is such that the high pressure element may, if desired, operate at a totally different speed than the two low pressure elements. Finally the entire arrangement is very compact and symmetrical, thus requiring a minimum amount of floor space for installation purposes.

In Fig. 3 I show another embodiment of my invention which is similar to that shown in Figs. 1 and 2 with the exception that the turbine element 10 is subdivided into a high pressure turbine element 41 and an intermediate turbine element 42, both of which are directly connected by a suitable coupling 43. In this embodiment, motive fluid exhausted by the high pressure turbine is conveyed by receiver pipes 44—44 to the intermediate pressure element 42 and is thence conveyed by receiver pipes 45—45 to the low pressure elements 11 and 12. In this embodiment, I may fixedly secure the end 46 of the intermediate pressure element 42 and permit the opposite end of this turbine element, as well as both ends of all of the remaining turbine elements, to move freely in a longitudinal direction. It is therefore obvious that my invention may be embodied in various forms of turbine organizations, irrespective of the number of turbine elements composing the organization. While in both embodiments I have fixedly secured an end of a turbine element which is located at some intermediate point in the series, nevertheless it is apparent that it is within the purview of my invention to establish this fixed point anywhere in the system and obtain the desired results.

While I have shown my invention in but two forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:—

1. In a turbine organization, the combination of a high pressure turbine element, a plurality of lower pressure turbine elements, all of said turbine elements having their axes located in substantially a common vertical plane, and receiver piping connecting the high pressure turbine element and the various low pressure turbine elements, the high pressure turbine element being movable longitudinally with respect to one or more of the low pressure turbine elements.

2. In a turbine organization, the combination of a high pressure turbine element, two low pressure turbine elements disposed in end-to-end relation with respect to each other and with respect to the high pressure turbine element, all of said turbine elements having their axes located in substantially a common vertical plane, and means for conveying motive fluid from the high pressure turbine element to the respective low pressure turbine elements, two of the turbine elements being movable longitudinally with respect to each other and with respect to the third turbine element.

3. In a turbine organization, the combination of a single flow high pressure turbine element, two double flow low pressure turbine elements disposed in end-to-end relation with respect to each other and with respect to the high pressure turbine element, all of said turbine elements having their axes located in substantially a common vertical plane, and receiver piping extending longitudinally on each side of the axes of the turbine elements and rigidly connecting the high pressure turbine element with the respective low pressure turbine elements, one end of one turbine element being fixed and the remaining end of that turbine element as well as both ends of all the other turbine elements being movable longitudinally.

4. In a power plant, the combination of an electrical generator, a high pressure turbine element connected to the electrical generator for driving the same, two low pressure turbine elements disposed in end-to-end relation with respect to each other and with respect to the high pressure turbine element, a second electrical generator directly connected to the two low pressure turbine elements, both the high and low pressure turbine elements together with their respective generators having their axes located in substantially a common vertical plane, and a receiver pipe arranged similarly on each side of the turbine axes for connecting the high pressure turbine element with the respective low pressure turbine elements, all but one of said turbine elements being entirely movable longitudinally.

5. In a power plant, the combination of an electrical generator, a high pressure turbine element directly connected to the electrical generator for driving the same, two low pressure turbine elements disposed in end-to-end relation with respect to each other and directly connected to each other, the rotors of the two low pressure turbine elements being movable independently of the rotor of the high pressure turbine element, a second electrical generator directly connected to the two low pressure turbine elements, and means for supplying all the motive fluid for the two low pressure turbine elements from the exhaust of the high pressure turbine element.

6. In a power plant, the combination of a single flow high pressure turbine element, two double flow low pressure turbine elements disposed in end-to-end relation with respect to each other and with respect to the high pressure turbine element, all of said turbine elements having their axes located in substantially a common vertical plane, receiver piping extending longitudinally from each side of the axes of the turbine elements and rigidly connecting the high pressure turbine element with the respective low pressure turbine elements, said receiver piping providing communication between the exhaust connection of the high pressure turbine element and the inlets of the low pressure turbine elements, one end of one turbine element being fixed and the remaining end of that turbine element, as well as both ends of all the other turbine elements, being movable longitudinally, an electrical generator directly connected to and driven by the high pressure turbine element, and a second electrical generator directly connected and driven by the two low pressure turbine elements.

In testimony whereof, I have hereunto subscribed my name September, 1925.

ROBERT C. ALLEN.